(12) United States Patent
Smith

(10) Patent No.: US 8,454,414 B1
(45) Date of Patent: Jun. 4, 2013

(54) DUAL PELVIC SNIP AND METHOD TO USE IT

(71) Applicant: Janice Lee Smith, Dryden (CA)

(72) Inventor: Janice Lee Smith, Dryden (CA)

( * ) Notice: Subject to any disclaimer, the term of this patent is extended or adjusted under 35 U.S.C. 154(b) by 0 days.

(21) Appl. No.: 13/739,099

(22) Filed: Jan. 11, 2013

Related U.S. Application Data

(60) Provisional application No. 61/720,985, filed on Oct. 31, 2012.

(51) Int. Cl.
*A22C 21/06* (2006.01)
(52) U.S. Cl.
USPC .......................................................... 452/106
(58) Field of Classification Search
USPC .................... 452/106, 120, 122, 176
See application file for complete search history.

(56) References Cited

U.S. PATENT DOCUMENTS

| 5,453,043 | A | * | 9/1995 | Monson | 452/160 |
| 5,462,479 | A | | 10/1995 | Hajek | |
| 5,690,548 | A | * | 11/1997 | Jones et al. | 452/160 |
| 6,210,263 | B1 | * | 4/2001 | Meyer | 452/120 |
| 6,244,949 | B1 | * | 6/2001 | Moody | 452/122 |
| 7,198,562 | B2 | * | 4/2007 | Whetstone et al. | 452/6 |
| 7,217,182 | B1 | * | 5/2007 | McConnell et al. | 452/198 |
| 7,896,416 | B2 | * | 3/2011 | Carter | 294/167 |
| 8,235,775 | B1 | * | 8/2012 | Moy | 452/160 |
| 8,382,562 | B1 | * | 2/2013 | Lavretsky | 452/137 |
| 2005/0227601 | A1 | | 10/2005 | Whetstone et al. | |

* cited by examiner

*Primary Examiner* — Richard Price, Jr.
(74) *Attorney, Agent, or Firm* — Luca D'Ottone; KB Patents

(57) ABSTRACT

The invention is a tool designed for dressing a deer in the field and safely, easily, and quickly removing the animal's intestines including a generally rectangular cuboid base, with attached on its right and left sides a set of blades parallely secured and having their sharp cutting edges extended downwardly with respect to the body of the cuboid; a handle located on the opposite face of the rectangular cuboid with respect of said sharp cutting edges of the side blades where said handle is pivotally connected, via a plurality of pins holding rigid bars, to an extendeable generally tubular rod designed to open the anus of a dead deer with an convex opening head and engage the internal surface of the anal cavity of the dead deer with at least rough grasping surface.

2 Claims, 8 Drawing Sheets

DUAL PELVIC SNIP AND METHOD TO USE IT

CLAIM OF PRIORITY FROM RELATED APPLICATIONS

The present application claims priority from U.S. Provisional Patent Application No. 61/720,985 filed on Oct. 31, 2012 to Janice Lee Smith, directed to a Dual Pelvic Snip, that is hereby incorporated by reference.

BACKGROUND OF THE INVENTION

1. Field of the Invention

The present invention generally relates to hunting devices and more specifically, to a tool specifically designed for dressing a deer in the field and safely, easily, and quickly removing the animal's intestines. This invention consists in a reusable, washable, dual pelvic snip for dressing a deer in the field, and a method to used, collectively the dual pelvic snip of the present application and the method to dressing a deer using it represent an improvement over the prior art.

2. Brief Description of the Prior Art

Deer dressing implements are well known in the art. Various Patents and Published Patent applications are in fact directed to field dressing devices. While developing the invention of the instant application independently the Inventor researched extensively the public record as well as the current market for spittoons and the most relevant examples found in the search are mentioned in the Information Disclosure Statement (IDS) attached.

Despite all the efforts listed above prior art patents describe structures that are either not truly convenient or else involve complicated, expensive, and overly difficult assembly and/or disassembly parts and procedures. Other devices have been advertised on various media but never patented or described into a printed publication.

SUMMARY OF THE INVENTION

The invention is a tool specifically designed for dressing a deer in the field and safely, easily, and quickly removing the animal's intestines.

It is then the principal object of the present invention is to allow users quicker and easier removal of animal intestines.

It is a secondary objective of the present invention to provide much safer dressing of deer once killed out in the field.

It is an additional objective of the present invention to provide a device that does not rust or deteriorate over time. It is a final objective of the present invention to provide for a device that is cheap to build, but that can eventually be sold at a premium.

These and other objective achieved by the device of the present invention will be apparent by the drawings, by their detailed description, and by the specification here from appended.

DESCRIPTION OF THE PREFERRED EMBODIMENT

Figure 1:
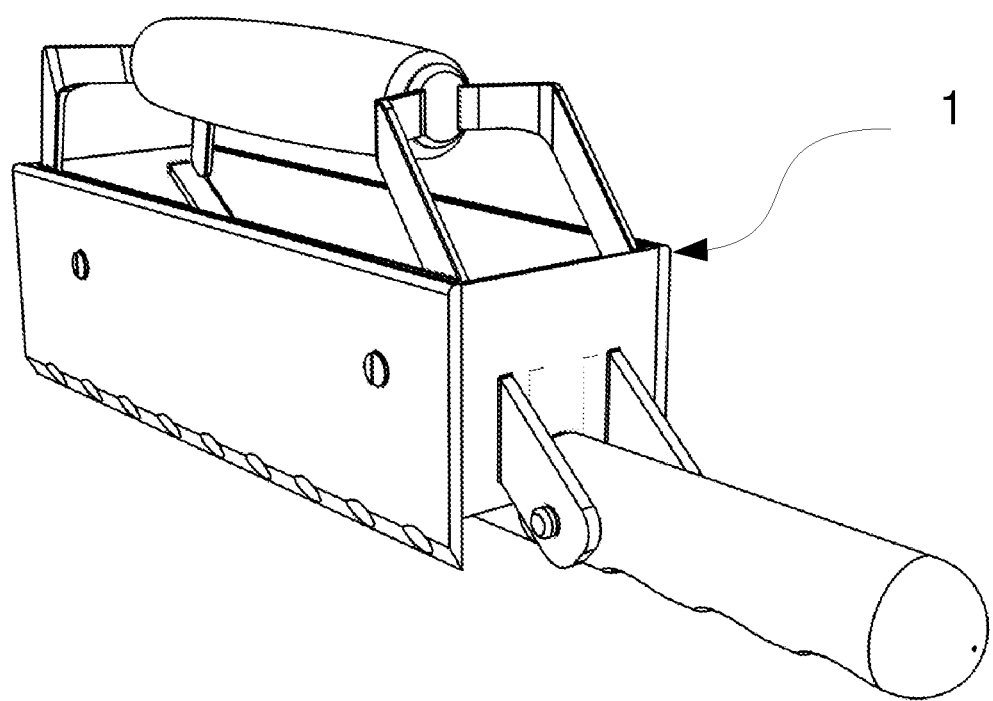
FIG. 1 is a first perspective view of one of the preferred embodiments of the dual pelvic snip in accordance with the teachings of the present invention.
Figure 2:
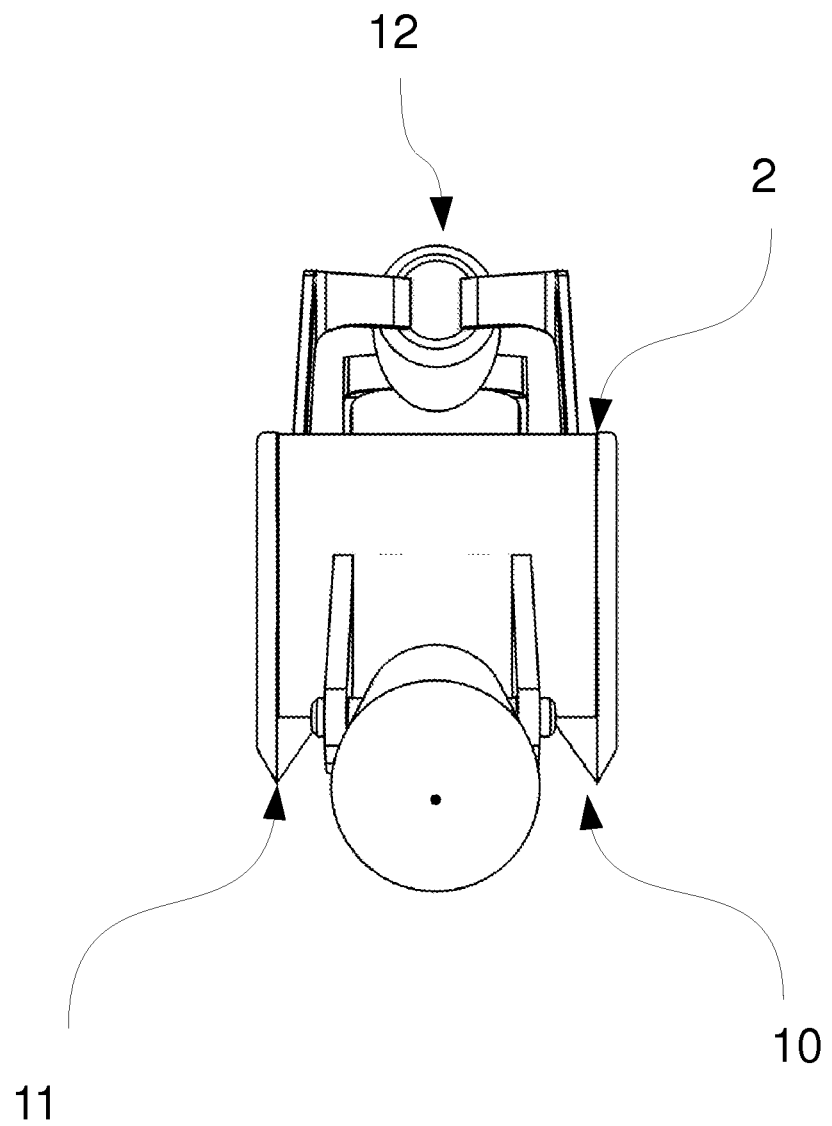
FIG. 2 is a front elevation view of the dual pelvic snip of FIG. 1.
Figure 3:
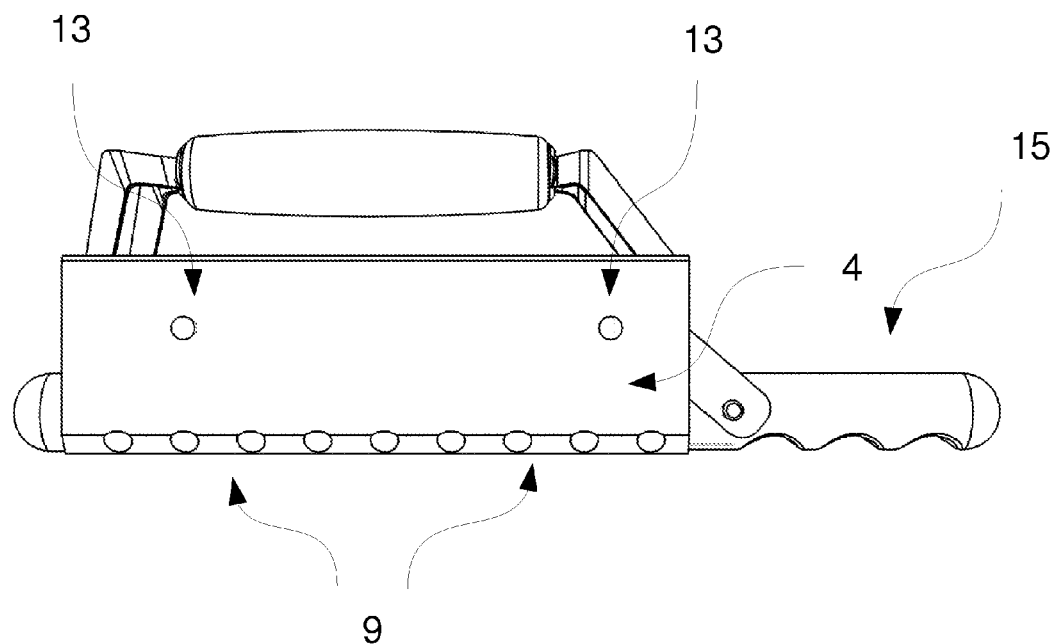
FIG. 3 is a left side elevation view of the dual pelvic snip of FIG. 1.
Figure 4:
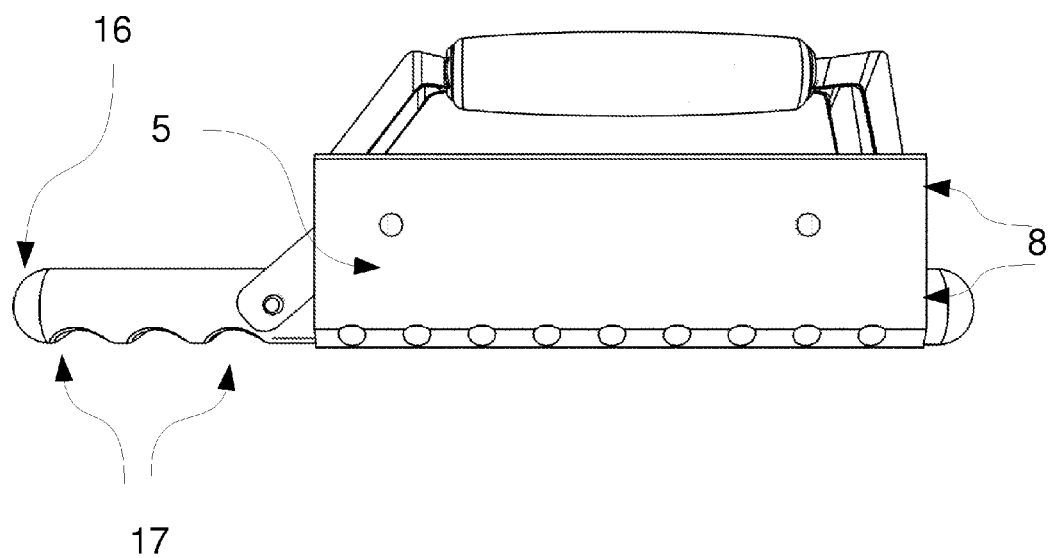
FIG. 4 is a right side elevation view of the dual pelvic snip of FIG. 1.
Figure 5:
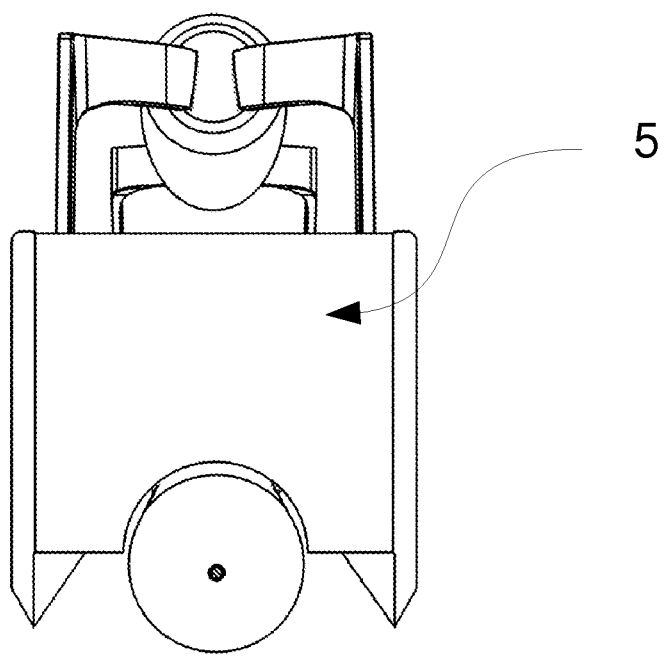
FIG. 5 is a back side elevation view of the dual pelvic snip of FIG. 1.
Figure 6:
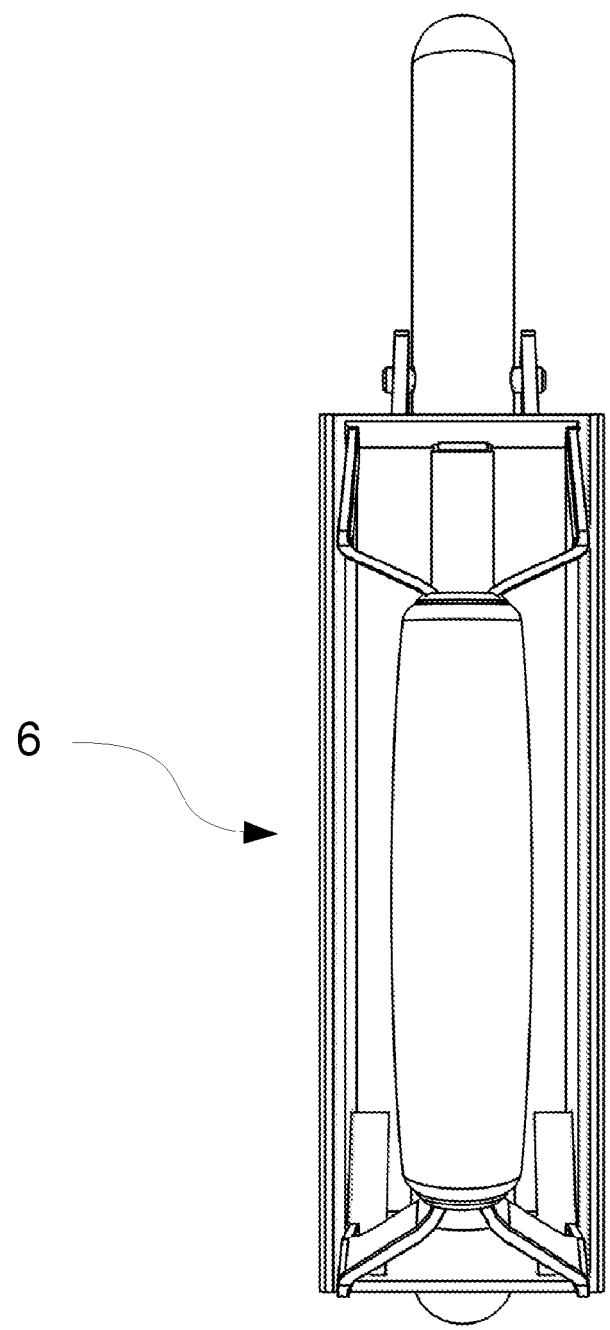
FIG. 6 is a top elevation view of the dual pelvic snip of FIG. 1.
Figure 7:
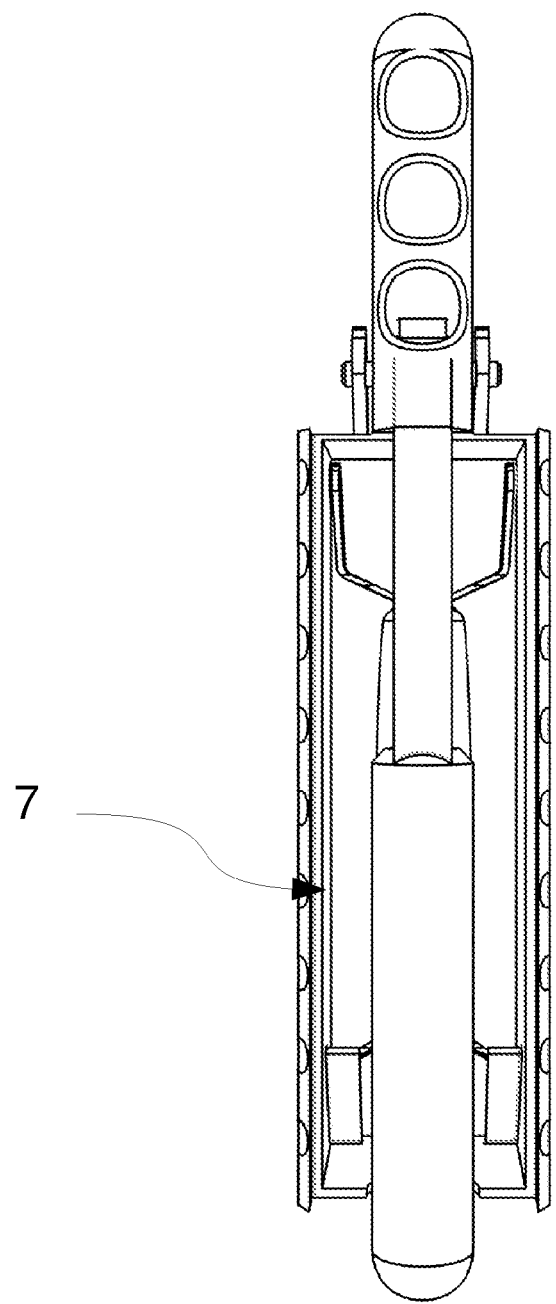
FIG. 7 is a bottom elevation view of the dual pelvic snip of FIG. 1.
Figure 8:
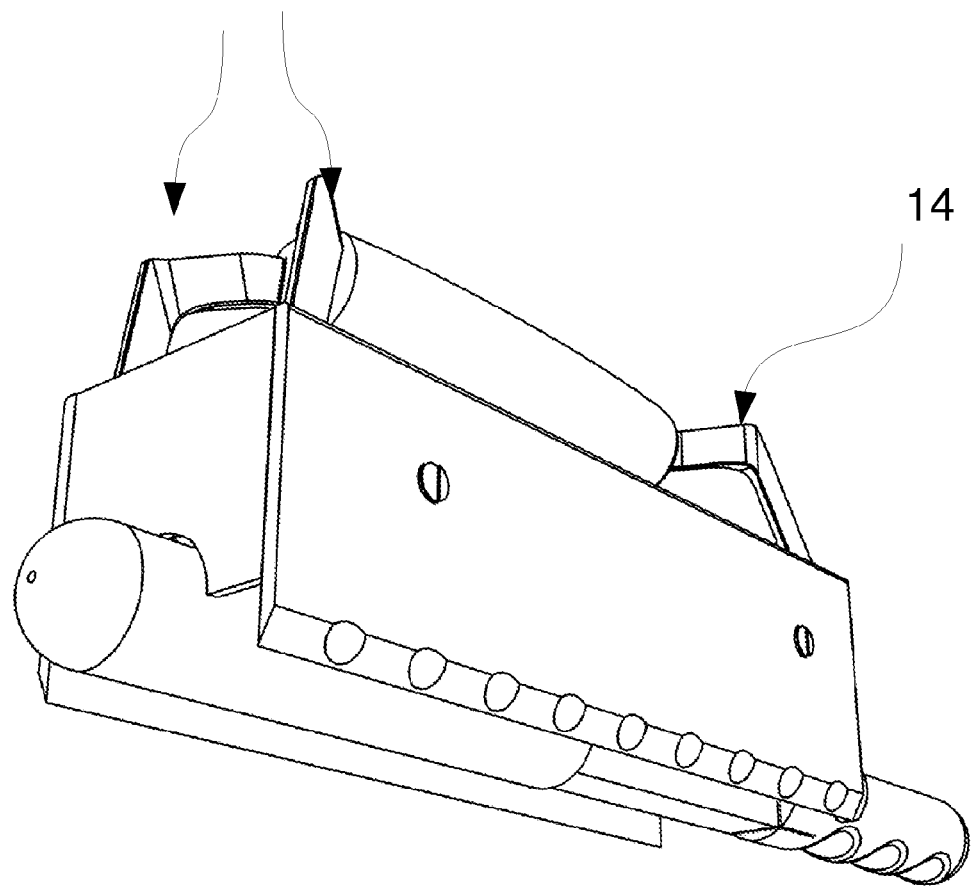
FIG. 8 is a back side perspective view of the dual pelvic snip of FIG. 1 and all it's features.

The invention is a tool specifically designed for dressing a deer in the field and safely, easily, and quickly removing the animal's intestines. "Dressing" a deer is a term that refers to the first steps of butchering and processing a deer killed in the wild. Dressing a deer in the filed means beginning the butchering process in the wild by cleaning up the carcass from most appendages and internal organs to avoid contamination and preserve the meat over time.

There are various way to dress a deer. Generally speaking the first step in proper field dressing is to cut out the deer's anus. One accepted way to do it is to cut a clean, deep circle around it using the pelvic bone as a guide. Pull it out at least 6 inches of the tube to make sure it's free. The hunter can use piece of string to close off the opening and keep loose feces pellets from falling out. But cutting the rectum loose allows it to slide out when the rest of the entrails are removed. Leaving a section of the digestive tract in the deer can spoil meat in a few hours.

The Dual Pelvic Snip generally consists of four parts: the handle, the body, two serrated blades, and the anal rod. To operate this tool, the hunter grips the handle and pivots the anal rod into the body of the deer via the anus. The two serrated blades then cut away approximately 7 cm (1¼ inches) of the pelvic area, clearing a path for the anal tube to pass through.

The anal tract is then engaged by the anal tube and removed in its entirety together with the bladder and other internal organs.

As it can be inferred from the drawings essential elements of the device for dressing a deer in the field of the present invention include a generally rectangular cuboid base (1), having six sides a front side (2), a back side (3), a left side (4), a right side (5), a top side (6), and a bottom side (7), having on its right and left sides respectively a right (8) and a left blades (9) parallely secured on the lateral sides of said base having their sharp cutting edges (10,11) extended downwardly with respect to the body of the cuboid; a handle (12) located on the opposite face of the rectangular cuboid with respect of said sharp cutting edges (10, 11) of the side blades (8,9) where said handle is pivotally connected, via a plurality of pins (13) holding rigid bars (14), to an extendeable generally tubular rod (15) designed to open the anus of a dead deer with an convex opening head (16) and engage the internal surface of the anal cavity of the dead deer with at least rough grasping surface (17).

After the deer is killed the animal is laid down in its prone position then the tail is moved so to uncover and expose the urogenital area of the animal. The hunter then insert the convex opening head in the anus of the animal, and exercise downwardly pressure so that the parallel blades cut open the skin on bot sides underneath the anus (pelvis). This operation is repeated a plurality of times so that an opening is cut open into the pelvis region of the deer. The hunter then engages the anal tract of the animal with the rough surface of the dual pelvic snip of the present application and pull away the whole anal tract and whatever internal organs remain attached to it such as the bladder.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for dressing a deer comprising a generally rectangular cuboid base, having six sides a front side, a back side, a left side, a right side, a top side, and a bottom side; said generally rectangular cuboid base having on its right and left sides respectively a right and a left blade parally secured onto said generally rectangular cuboid base and having their sharp cutting edges extended downwardly with respect to the body of the cuboid; and a handle located on the opposite face of the rectangular cuboid with respect of said sharp cutting edges of the side blades where said handle is pivotally connected via a plurality of pins holding rigid bars to an extendeable generally tubular rod terminating with a convex head and having at least one rough surface.

2. A method to remove the anal tract from a dead deer including the steps of killing the animal, laying it the body of said animal down in its prone position, moving the tail to uncover and expose the urogenital area of the animal, inserting the convex head of the device for dressing a deer of the present invention inside the anus of the animal, exercising downwardly pressure so that said right and left blade parallely secured onto said generally rectangular cuboid base cut open the skin on both sides underneath the anus of the animal, repeating this operation a plurality of times so that an opening is cut open into the pelvis region of the deer, engaging the anal tract of the animal with said rough surface of the device for dressing a deer of the present application, and pulling away the whole anal tract.

* * * * *